United States Patent
Maekawa

(10) Patent No.: US 8,730,308 B2
(45) Date of Patent: May 20, 2014

(54) VOLUME SCANNING THREE-DIMENSIONAL FLOATING IMAGE DISPLAY DEVICE

(75) Inventor: Satoshi Maekawa, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 371 days.

(21) Appl. No.: 12/679,178

(22) PCT Filed: Sep. 19, 2008

(86) PCT No.: PCT/JP2008/066977
§ 371 (c)(1),
(2), (4) Date: Mar. 19, 2010

(87) PCT Pub. No.: WO2009/038173
PCT Pub. Date: Mar. 26, 2009

(65) Prior Publication Data
US 2010/0214394 A1    Aug. 26, 2010

(30) Foreign Application Priority Data

Sep. 21, 2007    (JP) .................................. 2007-246286

(51) Int. Cl.
*H04N 13/04*    (2006.01)
(52) U.S. Cl.
USPC ...... 348/51; 348/E13.075; 359/619; 359/630; 359/633
(58) Field of Classification Search
USPC ............. 348/51, E13.075; 359/619, 630, 633
See application file for complete search history.

(56) References Cited

U.S. PATENT DOCUMENTS

| | | | | |
|---|---|---|---|---|
| 5,583,695 A | * | 12/1996 | Dobrusskin | 359/633 |
| 5,861,993 A | | 1/1999 | Shanks et al. | |
| 2004/0085643 A1 | * | 5/2004 | Ishikawa et al. | 359/619 |

FOREIGN PATENT DOCUMENTS

| | | |
|---|---|---|
| GB | 2287549 A | 9/1995 |
| JP | 56-158320 A | 12/1981 |
| JP | 5-336549 A | 12/1993 |
| JP | 9-506717 A | 6/1997 |
| JP | 2004-151645 A | 5/2004 |
| JP | 2005-10755 A | 1/2005 |
| WO | 95/16935 A1 | 6/1995 |
| WO | 2007/116639 A1 | 10/2007 |
| WO | 2008/111426 A1 | 9/2008 |
| WO | 2008/156163 A1 | 12/2008 |

OTHER PUBLICATIONS

Chinese Office Action dated Jun. 30, 2011, issued in corresponding Chinese Patent Application No. 200880107900.9.

(Continued)

*Primary Examiner* — Kyung H Shin
(74) *Attorney, Agent, or Firm* — Westerman, Hattori, Daniels & Adrian, LLP

(57) ABSTRACT

A volume scanning three-dimensional floating image display is constructed from a real mirror image forming optical system capable of forming the real mirror image of an object to be projected in a planar symmetric position with respect to a symmetry surface, and a display located under the symmetry surface showing images that serve as the object to be projected, and an actuator means capable of moving the display in a direction with a component perpendicular to the display surface, so by changing the displayed image synchronously with the motion of the display, the real mirror image of that image will be formed in the space on the other side of the symmetry surface as a three-dimensional floating image.

4 Claims, 14 Drawing Sheets

(56) References Cited

OTHER PUBLICATIONS

D. Miyazaki et al, "Volume Display System Based on Three-Dimensional Scanning of Inclined Optical Image," Optics Express, Dec. 25, 2006, vol. 14, No. 26, pp. 12760-12769, cited in spec.

Maeda, S et al, "Transmissive Optical Imaging Device with Micromirror Array", Proceedings of SPIE, vol. 6392, Oct. 3-4, 2006, p. 63920E-63920E8, cited in ISR.

Maekawa, S, 2-men Corner Reflector Array ni your Tashiten Kara Kanatsu Kano na Kukan Eizo Hyoji, 3D Eizo, vol. 21, No. 4, Dec. 15, 2007, p. 29-32, cited in ISR.

Maekawa, S, "Kagami Eizo no Jitsuzo o Ketsuzo suru Judo Kogaku Soshi no Kaihatsu", Image Lab, Apr. 1, 2007, p. 66-67, cited in ISR.

International Search Report of PCT/JP2008/066977, date of mailing Nov. 11, 2008.

Japanese Office Action dated Aug. 21, 2012, issued in corresponding Japanese Patent Application No. 2007-246286, with English trabslation (6 pages).

Japanese Office Action dated Nov. 5, 2013, issued in Japanese Patent Application No. 2012-232638, w/ English translation.

Maekawa, S. et al., "Transmissive Mirror Device with Micro Dihedral Corner Reflector Array", ITE Technical Report, vol. 30, No. 52, pp. 49-52, Oct. 18, 2006; w/ English abstract, cited in Japanese Office Action dated Nov. 5, 2013.

\* cited by examiner

Fig.4
(a)
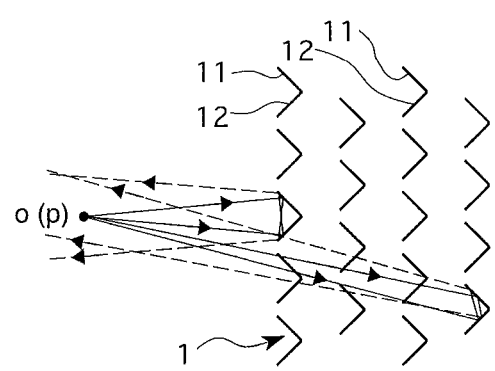
(b)
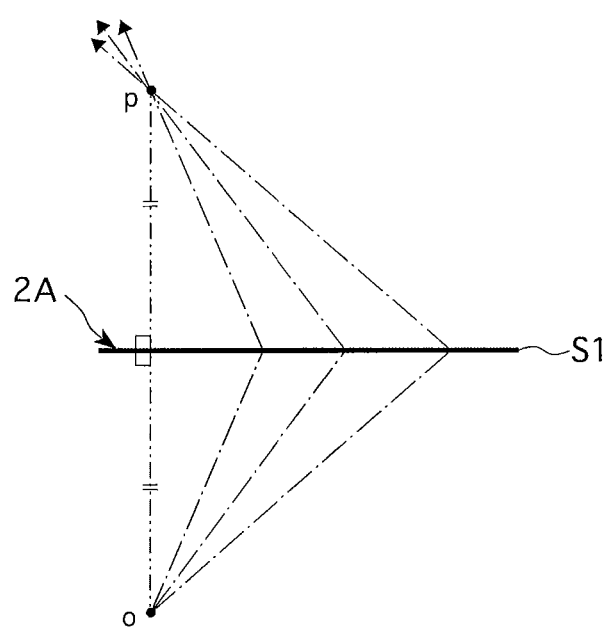

Fig.5
(a)
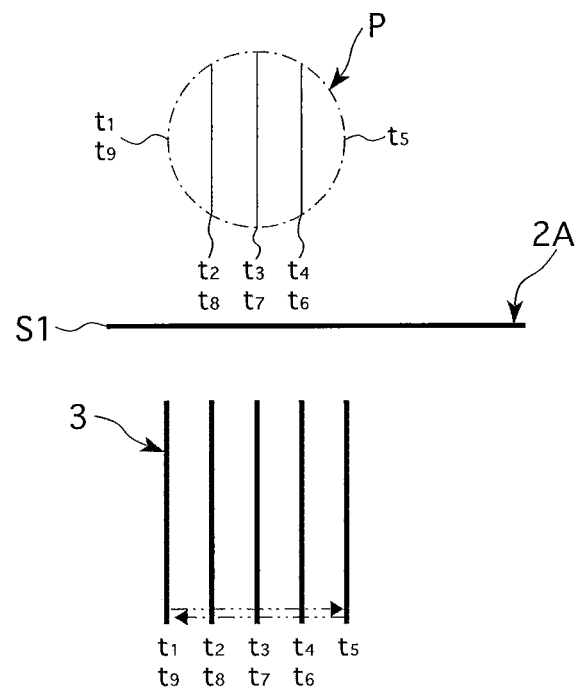
(b)
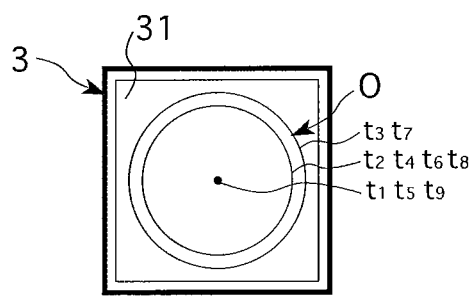
(c)
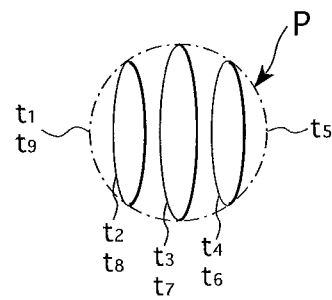

Fig.10
(a)
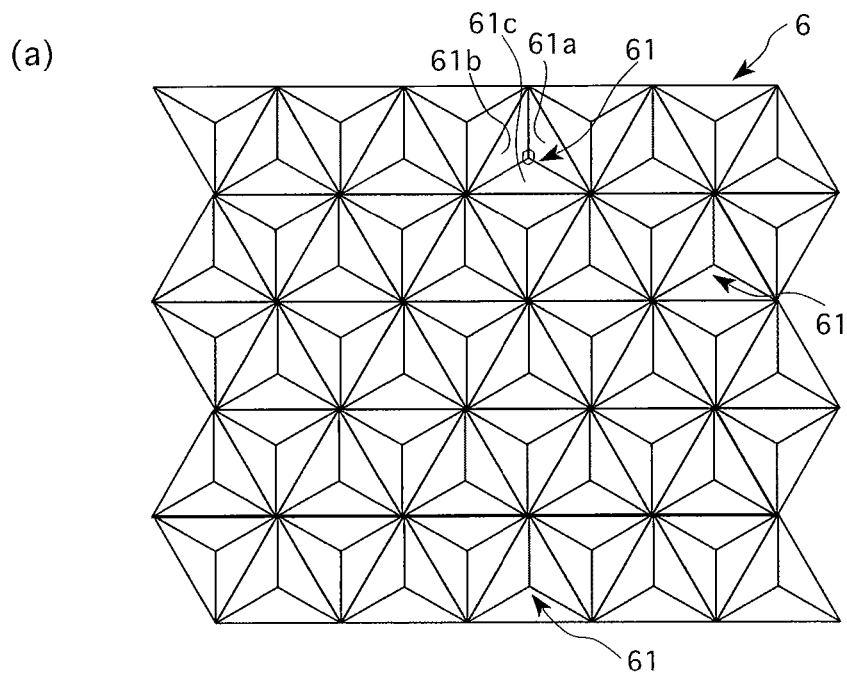
(b)
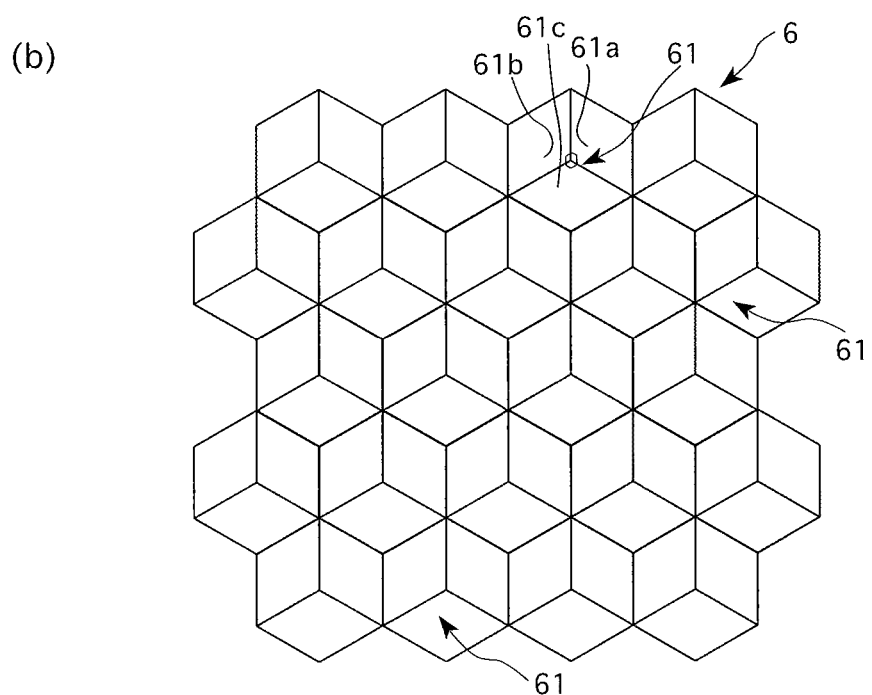

Fig.11
(a)
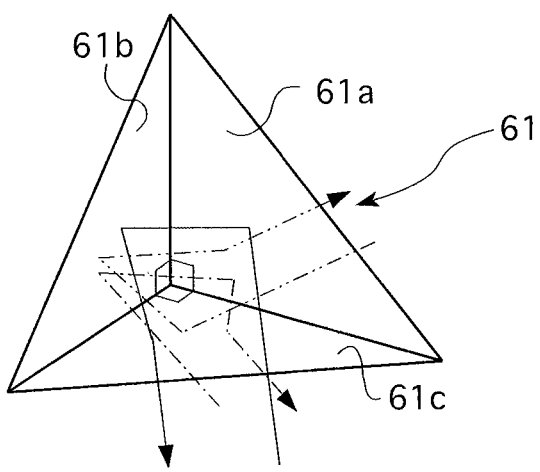
(b)
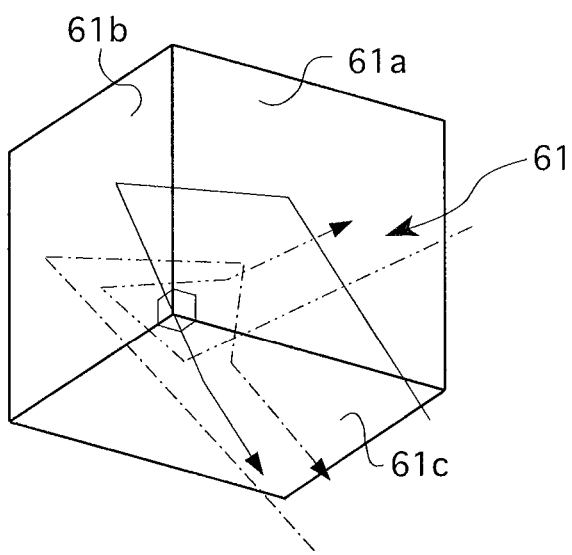

VOLUME SCANNING THREE-DIMENSIONAL FLOATING IMAGE DISPLAY DEVICE

FIELD OF THE INVENTION

The present invention is related to an optical system capable of displaying three-dimensional volume scanning floating images.

BACKGROUND OF THE INVENTION

Three-dimensional imaging technology has been developing in recent years. Many of the stereoscopic display devices currently being commercialized use only binocular disparity among the effects of stereoscopy, and because of this, problems arise due to such technical issues as focusing and convergence control, and the fatigue of the eyes when viewing for a long time; thus it is desirable to develop a more easily used technology. For example, in one proposed volume scanning three-dimensional method (see Non-Patent Reference 1), assuming the use convex lenses or concave mirrors as imaging optics, by arranging a two-dimensional high-speed display in a position tilted to the optical axis of the optical system, then moving the two-dimensional image that is tilted to the optical axis of the optical system by a scanner mirror, and in accordance with that, displaying the respective cross-sectional images of the object to be projected on the two-dimensional display, a three-dimensional image will be formed. When using this method, because a three-dimensional real image is formed, no attached objects such as glasses are required, and all the factors of human three-dimensional visual perception are satisfied.

Non-Patent Reference 1:
"Volumetric display system based on three-dimensional scanning of inclined optical image", Daisuke Miyazaki et al, Optic Express, Vol. 14, Issue 26, pp. 12760-12769

SUMMARY OF THE INVENTION

Problems to be Solved by the Invention

In case of a three-dimensional display method such as disclosed in Non-Patent Reference 1, since a convex lens or a concave mirror is used in the optical system, there is distortion in the shape due to aberration, and it is difficult to achieve completely stabilized positioning.

Meanwhile, the present inventor has proposed non-magnifying imaging optic systems, such as the real mirror image forming optical system consisting of a large number of dihedral corner reflectors composed of two mirror surfaces (hereinafter referred to as needed by "dihedral corner reflector array") (see Japanese Patent Application No. 2006-080009) and the real mirror image forming optical system using a retroreflector array with retroreflecting capability and a half-mirror (see Japanese Patent Application No. 2007-163323). Also, a real mirror image forming optical system has been proposed using an afocal lens array as an afocal optical device of infinite focal length, where the real mirror image of the object to be projected is formed with the optical device plane of the afocal lens array being the symmetry surface (see Japanese Patent Application No. 2005-10755). In addition, such methods as pointing the component dihedral corner reflectors of the above-mentioned dihedral corner reflector array into two or more directions, or by surrounding the object to be projected by the imaging optical device consisting of a retroreflector array and a half-mirror, thus making it is possible to observe the real mirror image of the object to be projected from multiple directions, have also been proposed (see Japanese Patent Applications No. 2007-054871, No. 2007-211992). These real mirror image forming optical systems can project the unit magnification real mirror image of the object to be projected without any distortion in a planar symmetric position with respect to the symmetry surface of the optical system (the optical device plane of the dihedral corner reflector array, or the half-mirror surface, or the optical device plane of the afocal lens array), thus they are capable of forming a two-dimensional image of a two-dimensional object to be projected, or a three-dimensional image of a three-dimensional object to be projected.

Thus the present invention sets out to provide a three-dimensional floating image display with a volume scanning method using the above-mentioned real mirror image forming optical systems, and in particular to provide a three-dimensional floating image display without distortions.

Means for Solving the Problem

The present invention is a volume scanning three-dimensional floating image display device (in the following sometimes called 'three-dimensional floating image display device'), consisting of a real mirror image forming optical system capable of projecting the real mirror image of the object to be projected to a planar symmetric position with respect to a geometric plane that will be the symmetry surface; a display equipped with an imaging surface showing the image that serves as the object to be projected and which is located under the above-mentioned symmetry surface; and an actuator means that can move the above-mentioned imaging surface in a direction containing a component perpendicular to the plane of the above-mentioned display; so that by making the images shown on the display change synchronized with the motion of the display due to the above-mentioned actuator means, it becomes possible to project a three-dimensional image of that display image (in the following called 'three-dimensional floating image') in the space above the symmetry surface.

In case of such a three-dimensional floating image display device, the real mirror image forming optical system can project without distortions the real mirror image of the object to be projected in a planar symmetric position with respect to the symmetry surface. However, the depth of the real image will be reversed with respect to the depth of the object to be projected. Furthermore, the term 'display' as used for the present invention is not restricted to displays in the ordinary sense of image displaying devices, but also intended to include screens that show images projected by projectors, and all other such devices that are capable of showing images; moreover, the display surface does not need to be flat but might as well be curved. Due to the display being moved by the actuator means in a path including a component perpendicular to its display surface, that is, due to its three-dimensional motion filling the three-dimensional space, the display and the actuator means in effect act as a volume scanning type three-dimensional display. For the actuator means, an appropriate device can be used that is capable of moving the display in a way that fills the three-dimensional space enclosing the display. Here the display movement can be a vibration in a certain direction, but also it can be any movement as long as it contains a component perpendicular to the display surface so as to fill the three-dimensional space. However, the expressions "spatial movement filling three-dimensional space", "three-dimensional movement", or "spatial movement" do not necessarily imply that the display needs to move with three spatial degrees of freedom, instead it might be a movement with one degree of freedom as long as it fills in a three-dimensional space region. It is desirable to locate the display in a range so that from an observation point at the upper side of the symmetry surface the real mirror image of the images displayed on the display surface is visible; however, it is acceptable if during the three-dimensional movement the display reaches such positions so the image temporarily disappears. With the three-dimensional floating image display device of the present invention, by using a real mirror image forming optical system, when a display capable of movements filling a three-dimensional space, in other words, a volume scanning display, is placed on one side of the symmetry surface, the real mirror image of the displayed images becomes visible in the space on its other side as a floating three-dimensional image without distortion.

One type of real mirror image forming optical system suitable for use in the present invention is a dihedral corner reflector array, having a large number of dihedral corner reflectors consisting of two mutually perpendicular specular surfaces that are perpendicular to a given optical device plane, arranged along that optical device plane, in which case that optical device plane becomes the above-mentioned symmetry surface. In this case, when the light emitted from the object to be projected passes through the optical device plane, it will be reflected once each on the two specular surfaces of each dihedral corner reflector, resulting in the component parallel to the optical device plane being reflected retroreflectively, so a real mirror image will be formed at a planar symmetric position with respect to the optical device plane. In other words, for the observer the real mirror image of the image, that is, a three-dimensional floating image, formed by being reflected from dihedral corner reflectors having their internal angles facing the observer, becomes visible.

Here, in order to be able to observe three-dimensional floating images from multiple viewpoints, it is possible to configure a three-dimensional floating image display device where the three-dimensional image, formed in the space on one side of the optical device plane, becomes observable from multiple directions, by adopting multiple dihedral corner reflectors that are rotated in multiple directions with the rotation axis perpendicular to the optical device plane. In more detail, each dihedral corner reflector should be arranged so that its opening faces in the direction of the volume scanning three-dimensional stereoscopic display that is placed on the underside of the optical device plane. Specifically, a real mirror image forming optical system using dihedral corner reflectors can be constructed as a dihedral corner reflector array being a set of multiple dihedral corner reflector arrays sharing a common optical device plane. If compared with the example of having multiple dihedral corner reflectors arranged along a single optical device plane facing into multiple directions, the case of having dihedral corner reflector arrays with their dihedral corner reflectors facing into the same direction, and placing a number of such dihedral corner reflector arrays along multiple planes, facing into different directions, and acting as a single dihedral corner reflector array, the latter can be easier to manufacture and might reduce the costs. Furthermore, multiple dihedral corner reflector arrays, each having their dihedral corner reflectors facing a common point, might be combined facing into multiple directions along a single plane, and acting as a single dihedral corner reflector array.

Here, considering the dihedral corner reflectors, in order to have light rays penetrate the optical device plane while being properly refracted by the dihedral corner reflectors, it is sufficient to think of the dihedral corner reflector as using the inner walls of the optical hole in the direction through the optical device plane as specular surfaces. However, this is a conceptual image of the dihedral corner reflector, and does not necessarily need to reflect the shape being determined by physical boundaries; thus for example the above-mentioned optical holes do not need to be independent of each other but might be constructed jointly.

Stating the structure of the dihedral corner reflector array in simple terms, it is a large number of specular surfaces nearly perpendicular to the optical device plane, arranged along the optical device plane. The problem of construction is how to support those specular surfaces with respect to the optical device plane. As a more concrete method of forming these specular surfaces, we can assume a substrate spanning a given space, assign one plane inside the substrate as the optical device plane, and let the dihedral corner reflector, as an optical hole penetrating the optical device plane, be formed by specular surfaces of the inner walls of holes penetrating the substrate. This hole formed in the substrate needs only to be transparent to light transmission, thus for example its interior may be filled with a transparent liquid or gas or vacuum. Furthermore, the shape of the holes can be arbitrary, as far as their internal walls are equipped with one or several, not co-planar, specular surfaces, and the light reflected on those specular surfaces can penetrate the holes; and the holes might be connected to each other, or some of them might be missing, or some of them might be of different shape. For example, the case of each specular surface being formed standing up near to each other on the surface of the substrate can be interpreted as the case of connected optical holes along the substrate.

Or for the dihedral corner reflector taken as an optical hole, it is possible to use a tubular body formed by a solid like transparent glass or plastic. Furthermore, when these tubular shapes are formed of a solid, these tubular bodies might be packed closely together to work as a supporting structure, or alternately, assuming that a substrate is provided, they might be placed protruding from the surface of the substrate. Also, the shape of the tubular bodies can be arbitrary, as long as there is one or several non-coplanar specular surfaces on their inner walls serving as dihedral corner reflectors, and the light reflected on those specular surfaces is being transmitted through them; and while they are referred to as tubular bodies, they might form complicated shapes with several of them be connected together, or some of them missing.

Here, as the above-mentioned optical hole, we can assume a cubic or rectangular shape with all the adjacent internal walls being perpendicular to each other. In this case, we can minimize the spacing between adjacent dihedral corner reflectors, which enables high density placement. However, it is desirable to reduce reflections on the surfaces other than those belonging to dihedral corner reflectors facing in the direction of the object to be projected.

If there are several specular surfaces in a dihedral corner reflector, light transmission might occur due to multiple reflections above the expected number of times. As a measure against such unwanted multiple reflections, when forming the two mutually perpendicular inner walls of the optical hole, the other walls besides these two walls might be made into non-specular surfaces, or they might be formed with a tilt so that they are not perpendicular to the optical device plane, or they might be made curved; thus three or more reflections that cause unwanted multiple reflections can be reduced or eliminated. To obtain non-specular surfaces, those surfaces might be covered with antireflective paint or film, or the surface roughness might be increased to cause diffuse reflection. The presence of a flat transparent substrate does not obstruct the operation of the optical device, thus a substrate might be used as a supporting or protecting element.

In addition, to achieve a brighter real mirror image of the displayed image, that is, a brighter three-dimensional floating image, it is desirable to place multiple dihedral corner reflectors along the above-mentioned optical device plane as closely together as possible, like for example along a grid. In this case there is also the advantage of being easy to be manufactured. For the specular surfaces of the dihedral corner reflectors, a flat surface of a shiny material such as metal or plastic might be used, regardless of whether it is a solid or liquid; or a flat boundary between transparent media with different refractive indices can also be used in reflection or total internal reflection. Also, if the specular surfaces are formed by total internal reflection, further reflections will likely exceed the critical angle of total reflection, so the unwanted multiple reflections due to multiple mirror surfaces can be expected to be naturally suppressed.

Furthermore, for the specular surface, as long as there is no problem with its functioning, it is allowable for it to be just a small fraction of an inner wall of the optical hole, or to be composed of several unit mirrors arranged in parallel. To state the latter case in other words, it is allowable for one specular surface to be divided into multiple unit specular surfaces. In this case, each unit is a mirror, and they are not necessarily located in the same plane, as long as they are parallel to each other. In addition, it is allowed for each unit mirror to be in a connected or a separated configuration. When a dihedral corner reflector array is configured as a real mirror image forming optical system, it requires dihedral corner reflectors formed by two mutually orthogonal specular surfaces, thus in each unit optical device two mutually orthogonal specular surfaces need to be formed. For these two mutually orthogonal specular surfaces too, they need not necessarily be in contact, but it is sufficient that when light is transmitted from one side of the optical device plane to the other, it is reflected once from each of those two specular surfaces, thus the configuration where the two specular surfaces are in contact, and the configuration where the two specular surfaces are separated, are both allowable.

As another real mirror image forming optical system applicable for the present invention, the system equipped with a retroreflector array that can recursively reflect light rays, and with a half-mirror that can reflect and transmit light rays can be mentioned, where the half-mirror surface serves as the symmetry surface of the real mirror image forming optical system, and the retroreflector array is placed on the same side of the half-mirror like the object to be projected. Here the action of the retroreflector called 'recursive reflection' means that the reflected light is reflected into the direction from where the incident light came (recursively reflected), thus the incident light and the reflected light are in reverse and parallel directions. The retroreflector array is an arrangement of such retroreflectors along an array, and if the individual retroreflectors are small enough, it is possible to consider the paths of the incident and reflected light rays to be coincident. For such a retroreflector array, it is not needed for the retroreflectors to be located in the same plane, but they might be scattered spatially in a three-dimensional manner. Furthermore, the half-mirror is an optical device that can both transmit and reflect light rays, preferably with the ratio of transmittance and reflectance near to the ideal 1:1 ratio.

Retroreflectors might be composed of three adjacent specular surfaces (in the broad sense they might be called 'corner reflectors'), or cat's eye reflectors might also be used. Corner reflectors might be used as consisting of three mutually orthogonal adjacent mirror surfaces, or of three adjacent mirror surfaces, with two of them at an angle of 90 degrees, while the third one having an angle of 90/N degrees (here N is an integer number); or three mirror surfaces having mutual angles of 90 degrees, 60 degrees, and 45 degrees.

In case of a multiple viewing-point floating imaging device using such a retroreflector array and half-mirror, as the light emitted from the object to be projected is reflected from the half-mirror, then recursively reflected from the retroreflector array so that it always returns in the original direction, then becomes transmitted through the half-mirror to form a real mirror image, the shape and position of the retroreflector array is not restricted as long as it is located so as to be able to receive the light reflected from the half-mirror. Furthermore, observation of the formed real mirror image is possible from directions facing the light transmitted through the half-mirror, and as the half-mirrors are arranged at angles less than 180 degrees, the real mirror image of the object to be projected might be observed from a number of directions corresponding to the number of half-mirrors.

Thus, when using a real mirror image forming optical system with retroreflector array and half-mirror for the three-dimensional floating image display device, as long as the retroreflectors are arranged so as to surround at least the display surface of the display device together with the half-mirror on the back side of that half-mirror, it will become possible to observe the three-dimensional floating image from multiple perspectives.

Other than the above, as a real mirror image forming optical system applicable for the present invention, there is an optical system using an afocal lens array which is a large number of afocal lenses with their optical axes perpendicular to an optical device plane, and arranged along that optical device plane; where that optical device plane becomes the symmetry surface. An afocal lens is a lens with its focal length set to infinity, which can be constructed for example from two lenses with their optical axis perpendicular to the optical device plane and spaced at the distance of their focal length, so by arranging such afocal lenses along the optical device plane, an afocal lens array can be constructed. For afocal lenses, convex lenses or fiber-optic lenses can be used.

For the three-dimensional floating image display device of the present invention, as the display device, a display capable of showing images on both of its front and back surfaces might be used. In case of such configuration, in particular when the display is located in such a way that the three-dimensional floating image of both of the display surfaces appears in an erect attitude from a perspective above the symmetry surface where both images are observable, as the display images of both display surfaces become visible from opposite directions, a multiple viewpoint three-dimensional floating image display device can be realized. If the displayed images on both display surfaces are the same, the same three-dimensional floating image will be formed and be observable from multiple perspectives; while if the possibility of showing different images on the two display surfaces is actively explored, it becomes possible to show either the same transparent image from opposite perspectives, or to let completely different three-dimensional floating images to be observed from different perspectives. Also, if different images are shown on the two display surfaces, it becomes possible to show separately front and back views in the three-dimensional floating images, thus it becomes possible to avoid showing a transparent view as the three-dimensional floating image. In addition, since the image formed by the real mirror image forming optical system of the present invention is inverted in depth, in order to display normal non-inverted three-dimensional floating images, it is necessary to invert the object to be projected in the depth direction in advance, but by using the dual surface display, it becomes possible to invert depth of the images for the front and back surfaces separately. However, in case the afocal lens array is used as the real mirror image forming optical system, if the display surface is made perpendicular to the optical device plane which is the symmetry surface, the three-dimensional floating image will be almost invisible.

In addition, in case of the three-dimensional floating image display device of the present invention, it is possible to locate the display so that its displaying surface is facing towards the symmetry surface of the real mirror image forming optical system (so the case when it is perpendicular to the symmetry surface is excluded). The actuator means may also be configured to operate in a way so the movement direction includes a component perpendicular to the symmetry surface. In that way, although only transparent images will be available since it is not possible to show different images depending on the observing direction, it will be possible to show multiple viewing point three-dimensional floating images with only a single displaying surface.

Effects Achieved by the Invention

According to the present invention, using a structure including a real mirror image forming optical system that can form the real mirror image of the object to be projected in a planar symmetric position with respect to a geometrical plane (symmetry surface), and a display and actuator means that functions as a volume scanning three-dimensional display, the image displayed on the volume scanning display becomes observable in the opposite side of the symmetry surface as a distortion-free three-dimensional floating image, and thus it becomes possible to provide a new kind of three-dimensional floating image projection method and observation method.

BRIEF DESCRIPTION OF THE DRAWINGS

FIG. 4 is a plane view showing schematically the imaging process of the dihedral corner reflector array of the first embodiment of the present invention.

FIG. 5 is a view showing schematically the image of the display of the three-dimensional floating image display device and its relationship with the three-dimensional floating image of the first embodiment of the present invention.

FIG. 10 is a front view showing schematically one part of the retroreflector array used in the real mirror image forming optical system of the second embodiment of the present invention.

FIG. 11 is a perspective view showing schematically the reflection of light rays in the retroreflector array of the second embodiment of the present invention.

DETAILED DESCRIPTION OF THE INVENTION

Hereinafter, preferred embodiments of the present invention are described below with reference to the drawings.
<First Embodiment>

Figure 1:
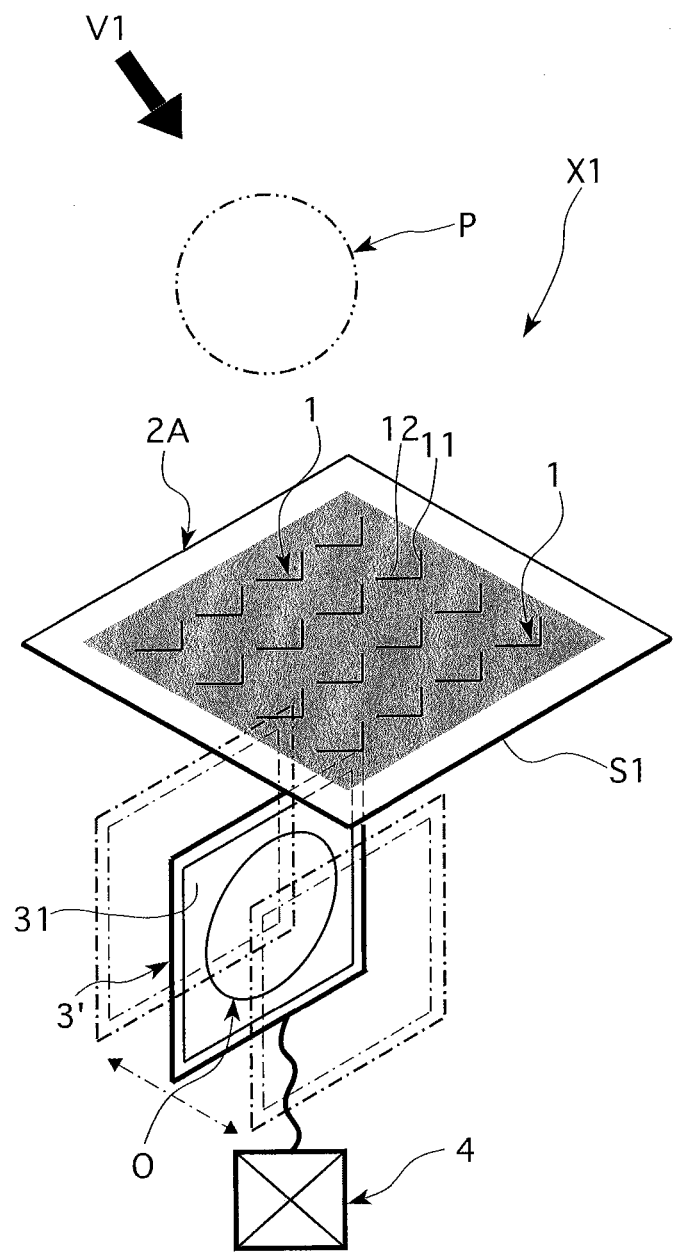
FIG. 1 is a schematic perspective view of the first embodiment of the three-dimensional floating image display device of the present invention.

In the following, the first embodiment of the invention is described referring to FIGS. 1 through 7. The volume scanning three-dimensional floating image display X1 (in the following abbreviated as 'three-dimensional floating image display device') of the present embodiment is, as shown in FIG. 1, equipped with a real mirror image forming optical system 2 composed of a large number of dihedral corner reflectors 1 (in the following abbreviated as 'dihedral corner reflector array') as one type of a real mirror image forming optical system, and with a display 3 having a display surface 31 showing images, and further with an actuator means 4 capable of moving display 3 in a three-dimensional motion. In other words, the successively appearing images O on the display surface 31 of the moving display 3, will be the objects to be projected as real images of mirror images (real mirror images) by the dihedral corner reflector array 2A of the present embodiment, thus forming the origin for the three-dimensional floating image P. The following is an explanation of each part.

Figure 2:
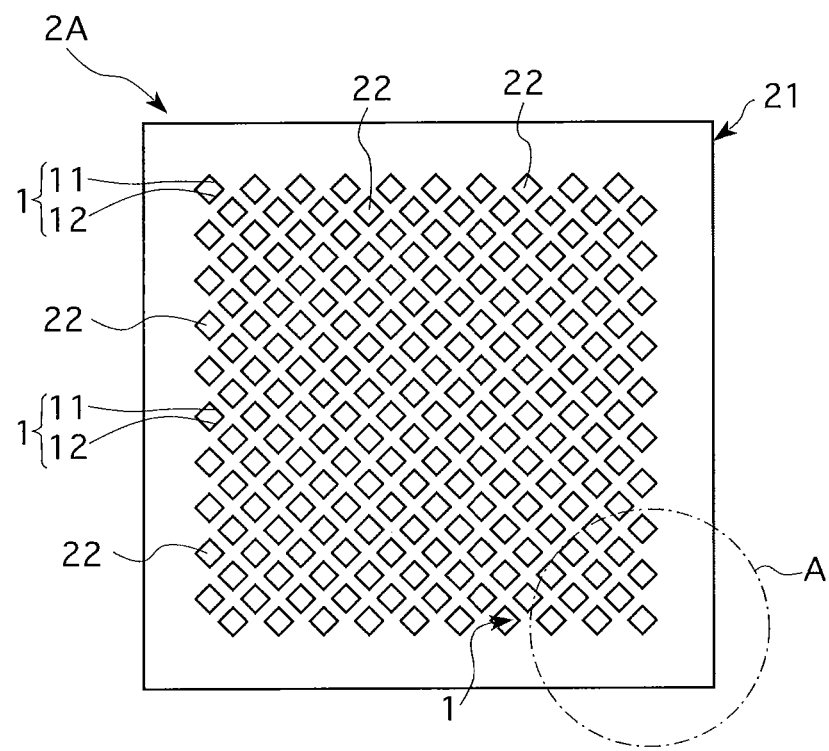
FIG. 2 is a schematic plane view of the dihedral corner reflector array used as the real mirror image forming optical system used be the first embodiment of the present invention.

The dihedral corner reflector array 2A has an optical device plane S1 as a plane nearly perpendicular to all of the pairs of specular surfaces 11, 12 forming the dihedral corner reflectors 1, and with that optical device plane S1 as the symmetry surface, forms the real mirror image of the image that is the object to be projected O in a planar symmetric position, thus allowing the observation of the three-dimensional floating image P. However, since the dihedral corner reflector 1 is of minuscule dimensions as compared with the dihedral corner reflector array 2A, in FIG. 1 the whole set of the dihedral corner reflectors 1 is indicated by gray shading, and the direction of its internal angle is indicated by a V mark. The dihedral corner reflector array 2A, as shown in FIG. 2, is equipped with a flat substrate plate 21, with that substrate 21 having a large number of holes 22 formed perpendicularly to the flat surface of the substrate and penetrating it in the thickness direction, where in order to make the inner walls of each hole 22 into dihedral corner reflectors 1, on two mutually perpendicular inner walls of holes 22 specular surfaces 11 and 12 are formed.

Figure 3:
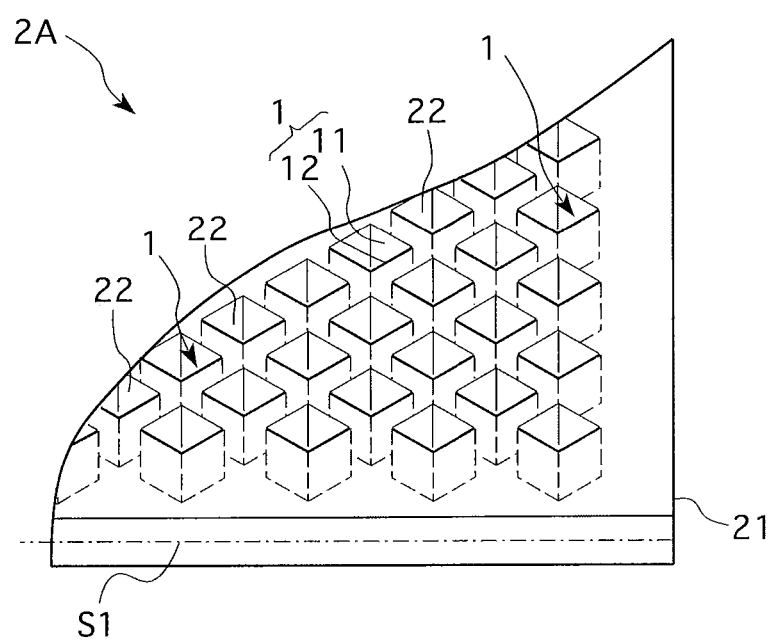
FIG. 3 is an enlarged perspective view of one portion of the dihedral corner reflector array of the first embodiment of the present invention.

Substrate 21 can have, for example, a thickness dimension of 50 to 200 micrometers, which is taken in this embodiment to be a thin plate of 100 micrometers, and in a plane view it can have a square shape with each side of about 5 cm; however, the thickness and shape of substrate 21 is not limited to these, and can be set as required. As shown in FIG. 3 as an enlargement of a part of FIG. 2, each dihedral corner reflector 1 is formed as physical and optical holes in substrate 21 in order to transmit light through it. In this embodiment, first a large number of holes 22 with shapes that are about rectangular in plane view (in this embodiment, concretely square) are formed in substrate 21, and two adjacent and perpendicular inner walls of each hole 22 are made into mirror-finished specular surfaces 11 and 12, thus having those specular surfaces 11 and 12 act as the dihedral corner reflector 1. Furthermore, those inner walls of hole 22 that do not belong to dihedral corner reflectors 1 are preferably not processed by mirror-finish treatment, instead they are processed into non-specular surfaces that do not reflect light, or they are oriented at an angle, so that to suppress multiple reflections. Each dihedral corner reflector 1 is manufactured in such a way, that the internal angle formed by the specular surfaces 11 and 12 along the substrate 21 will all be pointing in the same direction. In the following, we shall refer to the direction of the above-mentioned internal angle formed by the specular surfaces 11 and 12 as the orientation (direction) of the dihedral corner reflector 1. With respect to the manufacturing of the specular surfaces 11 and 12, in the present embodiment first we create a metal mold, with the internal walls that comprise the specular surfaces 11 and 12 being manufactured by nano-machining into specular finish, where the surface roughness is below 10 nm, in order to achieve uniform mirroring capability across the whole visible spectrum.

In concrete terms, for the present embodiment each mirror element 11, 12 that comprises the dihedral corner reflector 1 might have a side length of 50 to 200 micrometers, with this length in the present embodiment being 100 micrometers; where first a mold is created by the above-mentioned nano-machining method, and using that mold with nano-scale pressing technology, for instance with nano-imprint technique or electro-forming technique, a multitude of the above-mentioned dihedral corner reflectors 1 are formed in each substrate 21. In the present embodiment, the sides of each dihedral corner reflector 1 that form a V shape along the optical device plane S are pointed at 45 degrees toward the side or length direction of the substrate 21, and each dihedral corner reflector 1 is arranged along the points of some regular lattice along the optical device plane S, all pointing in the same direction. By reducing the distance between neighboring dihedral corner reflectors 1 as far as possible, the transmittance can be improved. Furthermore, those parts of the above-mentioned substrate 21 that are not components of dihedral corner reflectors 1 are processed to be opaque, and the upper and lower surfaces of substrate 21 are covered with thin transparent protective sheets (not shown in the Figures). In the present embodiment, we use dihedral corner reflector arrays 2A that have several tens or hundreds of thousands of the above-mentioned dihedral corner reflectors 1 for each substrate 21.

As another manufacturing method, when substrate 21 is formed from aluminum or nickel by electroforming, the specular surfaces 11 and 21 shall be naturally specular surfaces, assuming that the surface smoothness of the mold is sufficiently good. When the nano-imprinting method is used and substrate 21 is made from resin, in order to form the specular surfaces 11 and 12, it is necessary to equip it with a specular coating, by sputtering or similar methods.

When the dihedral corner reflector 1 is thus formed in substrate 21, it shall have the property that light entering hole 22 from the top (or bottom) surface of substrate 21 shall be reflected once from one of the mirrors (11 or 12), then reflected again from the other mirror (12 or 11), thus transmitting it to the bottom (or top) surface; so when the light path is viewed from the side, the entering light path and the exiting light path shall be planar symmetric with respect to the plane of the substrate 21 between them; therefore when the above-mentioned substrate 21 has a multitude of dihedral corner reflectors 1 arranged along it, it will function as a dihedral corner reflector array 2A. Therefore, the component optical device plane s (assuming a plane along the half thickness of substrate 21, perpendicular to each mirror element, shown in the Figure by imaginary line) of the above-mentioned dihedral corner reflector array 2A shall be a plane that forms the real image of the object to be projected, placed on one of its sides, on its other side.

Hereafter the process of imaging by a dihedral corner reflector array 2A of the present embodiment shall be explained together with the light path of lights emitted from the object to be projected o, taken to be a point light source. As shown schematically in a plane drawing in FIG. 4(a) and in a side view drawing in FIG. 4(b), light (in the direction of the arrow, indicated by solid line; in FIG. 4, in a three-dimensional sense passing from the space behind the paper to the space above it) emitted from the point light source o as passing through the hole 22 (omitted in the figures) prepared in the substrate 21 (not shown in the figures) for the dihedral corner reflector array 2A, shall be reflected once from one specular surface 11 (or 12) forming the dihedral corner reflector 2, then again reflected (reflected light paths indicated by broken lines) from the other specular surface 12 (or 11), thus passing through the optical device plane S1 (transmitted light paths shown by broken lines), therefore while spreading out, will pass through a planar symmetric position with respect to the optical device plane S1 of the above dihedral corner reflector array 2A to the point light source o (in the figure, through the position p). Thus in effect, the transmitted light will converge in a planar symmetric position to the point light source o with respect to the optical device plane S1, forming the real image p.

Display 3 might have a curved surface, but with an approximately flat display surface 31, the display might be chosen appropriately from well known variants as desired. In the present embodiment, as shown in FIG. 1, a display 3 with a planar display surface 31 is adopted, with the display surface 31 arranged perpendicularly to the optical device plane S1 in the space under the dihedral corner reflector array 2A. It should be noted that it is not necessary for the display 3 to be located in this manner, but any desired configuration might be adopted as long as when observed from the upper side of the dihedral corner reflector array 2A, the real mirror image of the image O shown in the display surface 31 will stay visible.

The actuator means 4 is for moving display 3 in a three-dimensional manner, so driving mechanisms for various purposes, such as motors, springs, gears, rails, or such might be used as appropriate. In this embodiment, as shown in FIG. 1, the adopted actuator means 4 is configured for moving the display 3 (and its display surface 31) in the space under the optical device plane S1 of the dihedral corner reflector array 2A vibrating (reciprocating) parallel to the bottom of the optical device plane S1. For an actuator means 4 causing such reciprocating movement to the display 3, for instance a set of rails (not shown) installed parallel to the optical device plane S1 of the dihedral corner reflector array 2A, and a motor (not shown) reciprocating display 3 along that rails, might be used. Furthermore, the image O shown in the display surface 31 of display 3 will be sequentially altered in accordance with the changes in position of the display 3 due to being moved by the actuator means 4. This way, by the actuator means 4 moving display 3 in a three-dimensional way, display 3 and actuator means 4 together function as a volume scanning three-dimensional display.

The movement of display 3 here was described as a reciprocating motion keeping its surface parallel, but it need not be necessarily kept parallel. Moreover, it is not necessarily required to coordinate the direction of movement with the display surface. Furthermore, the movement here is a reciprocating motion, but that is also not required, instead a circulating one-way movement might also be used.

In the following, for the three-dimensional floating image display device X1 of the present embodiment, we shall explain by an example the images O that are sequentially shown in the display surface 31 of display 3, and the three-dimensional floating image P of those images O as formed by the dihedral corner reflector array 2A. In this example, we assume that as the display 3 passes through one half (outward, return trip) of the reciprocating motion, images depicting a ball are drawn sequentially in the image display surface 31, and accordingly the three-dimensional floating image P which is a real mirror image (although the depth is inverted to O) is formed. In FIG. 5 (a), showing intermittently the temporal relative position of the dihedral corner reflector array 2A and the display 3, so that during one reciprocating motion of the display 3, at time instances t1 through t9 it reaches the positions shown in the figure, thus at time t1 it is at the starting position of the oscillation, at t5 it has reached the other end of the swing, and at t9 it has returned to the same starting position like at t1. At each time instant t1 through t9, the display surface 31 of display 3, as shown in FIG. 5(b), circles with constant center positions and with changing diameters are shown sequentially. In accordance with this, as shown in FIGS. 5(a) and (c), at a planar symmetric position to display surface 31 with respect to the optical device plane S1 of the dihedral corner reflector array 2A, images of O with identically shaped circles are formed as the real mirror images P of the image of O in each time instant. Since the actual movement of display 3 is continuous, from the observer's point of view V1, the three-dimensional floating image P will be visible as the transparent image of a sphere. However, this sphere is reversed in depth as compared with the three-dimensional image produced by the movement of the display 3.

Thus, in this embodiment of the three-dimensional floating image display device X1, the display 3 and the actuator means 4 will serve in effect as a three-dimensional display, and through the dihedral corner reflector array 2A, for the image O displayed continuously on the display surface 31 of display 3, its distortion-free three-dimensional floating image P is formed in a planar symmetric position with respect to the symmetry surface S1, providing a three-dimensional image floating in the empty air in a totally stable position that is invariant to left-right or up-down motions of the viewing point; thus realizing a new three-dimensional displaying method.

Figure 6:
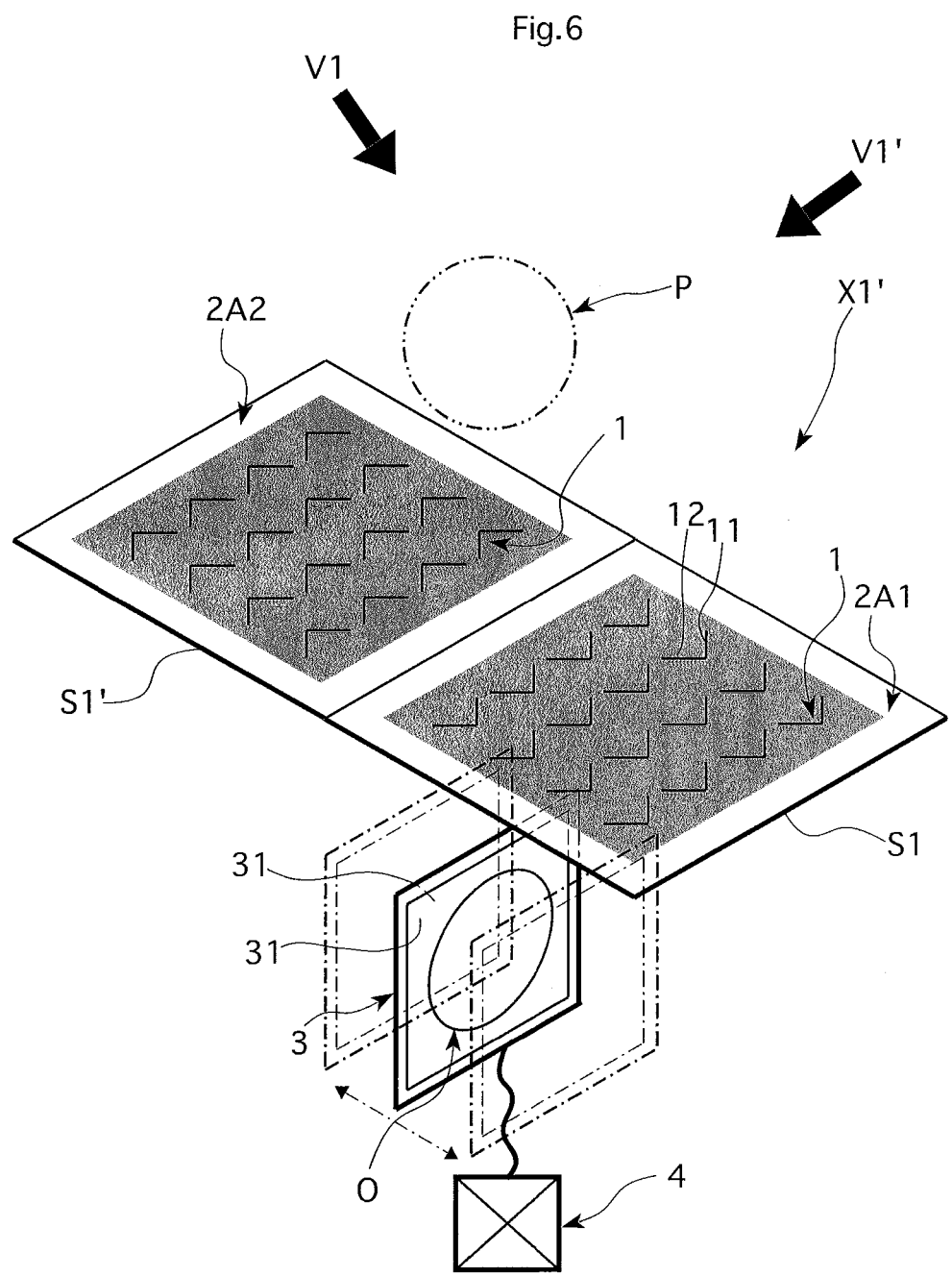
FIG. 6 is a perspective view showing schematically a multiple viewpoint three-dimensional floating image display device as an exemplary variant of the first embodiment of the present invention.

In case of using a dihedral corner reflector array 2A composed of dihedral corner reflectors 1 all facing in the same direction, the observing direction is limited to certain directions, but by using a dihedral corner reflector array 2A having dihedral corner reflectors 1 facing in several directions, such a three-dimensional floating image display device X1' can also be made possible where the three-dimensional floating image P can be viewed from multiple directions. For example, as shown in FIG. 6, two devices equivalent to the above dihedral corner reflector array 2A used in the present embodiment might be used (in the figure, designated by dihedral corner reflector arrays 2A and 2B), with dihedral corner reflectors 1 arranged all along their optical device planes S1 and S1' facing towards each other, and furthermore, the display 3' will have two display surfaces 31 and 31, moved in a three-dimensional manner by the actuator means 4, so that the images O shown synchronized to its position are the same for both display surfaces 31 and 31. This will result in having transparent three-dimensional floating images P with the same shape becoming visible simultaneously from the observing points V1 and V1'. In addition, in another embodiment two dihedral corner reflector arrays 2A with the dihedral corner reflectors 1 facing into multiple directions are used, together with multiple displays 3 or display surfaces 31 according to the number of directions of the dihedral corner reflectors 1, that are moved appropriately by the actuator means 4, by which arrangement it is also possible to make the three-dimensional floating image P viewable from multiple viewing points; so for instance by showing individually the front and back sides of the three-dimensional floating image, it becomes possible to show a three-dimensional floating image which is not a transparent image. Furthermore, there is a depth reversal in the images formed by the real mirror image forming optical system used in the present invention, so in order to project non-reversed three-dimensional floating images, it is necessary to reverse in advance the depth of the object to be projected, but by using both display sides as display surfaces, it becomes possible to reverse independently the depth of the front and back displayed images.

Figure 7:
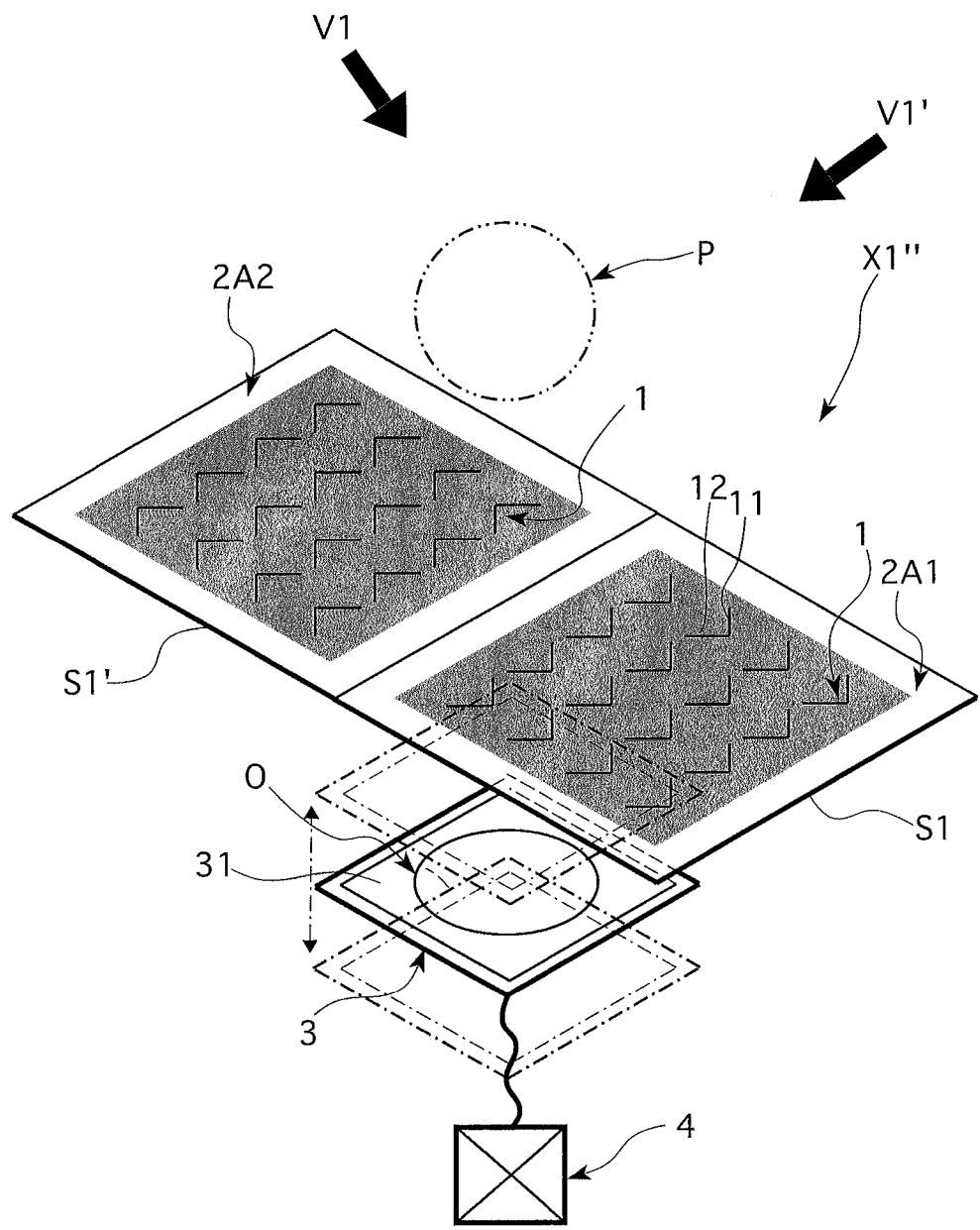
FIG. 7 is a perspective view showing schematically a multiple viewpoint three-dimensional floating image display device as another exemplary variant of the first embodiment of the present invention.

Furthermore, a configuration is also possible where two dihedral corner reflector arrays 2A1 and 2A2 are used like in the three-dimensional floating image display device X1" shown in FIG. 7, the display surface 31 of the display 3 is placed facing the optical device planes S1 and S1' that are the symmetry surfaces, and the actuator means 4 moves the display 3 in a three-dimensional manner in the direction perpendicular to the optical device planes S1 and S1'. In this case, even if the display surface 31 is a single plane, observation from multiple viewpoints (in the example shown in the figure, from viewpoints V1 and V1") becomes possible. However, in this case it is not possible to change the image according to the point of view, thus only transparent three-dimensional images can be displayed.

Figure 8:
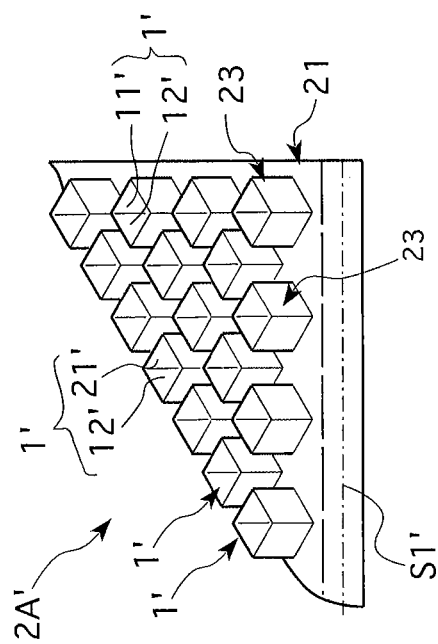
FIG. 8 is a perspective view showing schematically another example of a dihedral corner reflector array applied to the first embodiment of the present invention.

In addition, to obtain a dihedral corner reflector that is used to construct a dihedral corner reflector array, it is only required to have two mutually perpendicular specular surfaces; for the specular surfaces, we might use a metallic or other similar specular surface with mirror-grade surface smoothness, or we might use reflection on a mirror coating; or we might use the effect of total internal reflection along a boundary surface with mirror-grade surface smoothness between two transparent materials with different refraction coefficients. More specifically, for instance in the above-mentioned exemplary embodiment, the dihedral corner reflector array 2A was constructed by creating square holes 22 in a thin plate-shaped substrate 21, with two of their adjacent internal surfaces forming a dihedral corner reflector; but instead of that construction, as shown in FIG. 8, it is possible to form transparent obtrusions 23 on the surface of the substrate 21 in the thickness direction, arranging a large number of those obtrusions 23 in a chessboard pattern to form the dihedral corner reflector array 2A'. In this case, each obtrusion 23 might have among its inner walls two perpendicular surfaces 11' and 12' prepared with mirror finish, thus forming a dihedral corner reflector 1'. In this case, similarly to the above-mentioned embodiment, the light that is reflected twice from the dihedral corner reflector 1' passes through a planar symmetric point with respect to the surface of substrate 21, thus with respect to the optical device plane S1', thus in a planar symmetric position to the object to be projected in the other side of the optical device plane S1', a three-dimensional floating image will be formed.

The other surfaces of the obtrusions 23 besides the mirror surfaces 11' and 12' might be prepared with non-reflecting properties, or they might be tilted to a non-perpendicular angle with respect to the optical device plane S', in order to reduce unwanted reflections, thus improving the clarity of the image. Furthermore, these specular surfaces 11' and 12' constituting the dihedral corner reflector 1' might make use of total internal reflection, or they might be prepared with mirror coatings. In particular, when the specular surfaces 21' and 22' operate by the principle of total internal reflection, insofar as total internal reflection has a critical angle, it can be expected that multiple reflections will be less likely to occur. Furthermore, by equipping the surfaces of the tubular bodies that are to be used as specular surfaces with metallic mirror coatings, adjacent tubular bodies might be bonded together. In that case it becomes necessary to equip the other surfaces besides the specular surfaces with some non-reflecting coating; however, the aperture ratio will be improved, resulting in a dihedral corner reflector array with excellent light transmission properties.

Furthermore, as for the two specular surfaces constituting the dihedral corner reflectors 2, so far as two mutually perpendicular mirror surfaces can be prepared, it is not necessary for them to touch each other, but might be arranged with a gap between them; also, the shapes of the multiple viewing-point floating imaging device and the dihedral corner reflector array can be set freely and they are not be limited to the specific embodiment of the above configurations for each part, but are subject to various possible changes.

<Second Embodiment>

Figure 9:
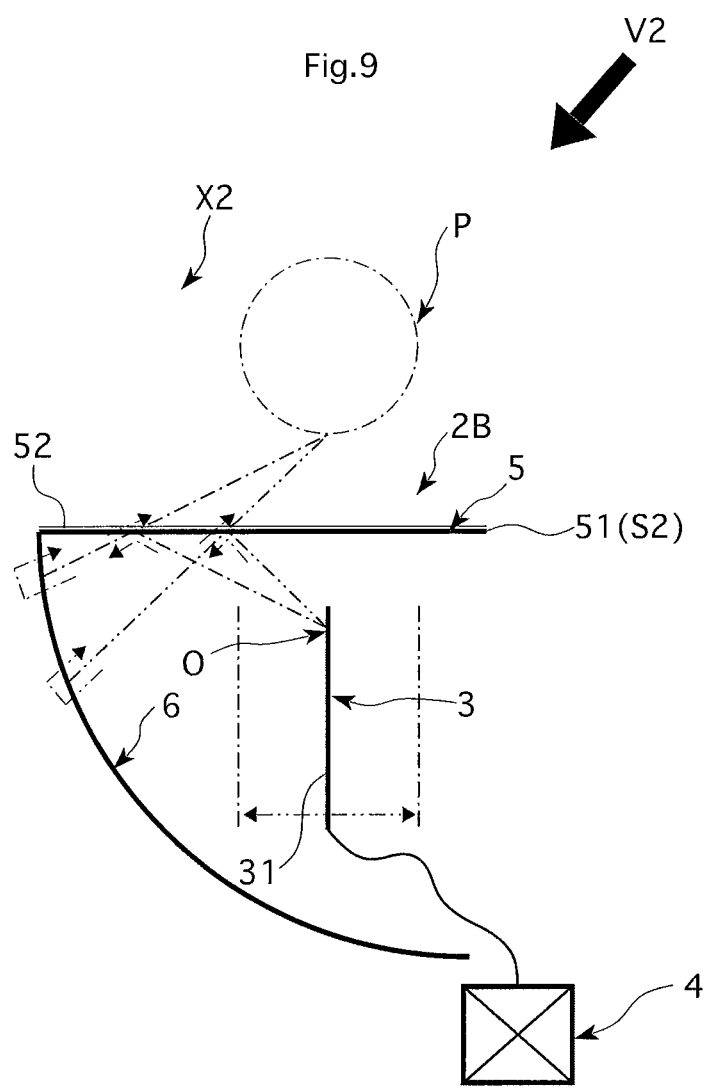
FIG. 9 is a side view showing schematically the three-dimensional floating image display device of the second embodiment of the present invention.

Next the second embodiment of the present invention is described referring to FIGS. 9 through 12. Pertaining to this embodiment, in the three-dimensional floating image display device X2 the real mirror image forming optical system is changed from the dihedral corner reflector array 2A used in the above-mentioned first embodiment to the real mirror image forming optical system 2B that is configured with a half-mirror 5 and a retroreflector array 6. The configuration of the display 3 and the actuator means 4 is similar to the case of the first embodiment. The real mirror image forming optical system 2B used in the present embodiment, as shown in FIG. 9, has the half-mirror surface 51 of the half-mirror 5 as the symmetry surface S2, and the images O shown in the display surface 31 of the display 3 located in the space under the half-mirror surface 51 will be reflected from the half-mirror surface 51, then returned in the incident direction by being recursively reflected from the retroreflector array 6, then by being transmitted through the half-mirror surface 51, the real mirror image of the temporal set of the images O will be formed at the planar symmetric position to the half-mirror surface 51 serving as the symmetry surface S2, resulting in the three-dimensional floating image P.

In such a real mirror image forming optical system 2B, for its half-mirror component 5, a transparent thin board made of transparent plastic or glass or such, with thin reflective coating on one of its sides, might be used. By processing the surface of this transparent thin board opposite to the reflecting surface with an anti-reflective coating (AR coating), it is possible to prevent forming a duplex real image P. It is also possible to laminate light controlling optical films or visibility angle control films 52, on the effective surfaces of the half-mirror reflector arrays, where the above-mentioned optical films will be used as a means to pass through light rays in specific directions, and block light in other directions; or disperse light in specific directions only. In concrete terms, by the above-mentioned optical film 52, the light emitted from the image O and transmitted directly through the half-mirror 5 can be prevented from reaching regions other than the observation point V2, thus it becomes possible to prevent the image O in the display surface 31 of display 3 to become directly visible through the half-mirror 5 from positions other than the observation point V2; while at the same time only the light, which is, as explained later, once reflected by the half-mirror 5, then retroreflected by the retroreflector array 6, then transmitted through the half-mirror 5, forming the three-dimensional floating image P as the set of the real mirror images of the image O, will be visible from a specific observation point V2.

Meanwhile, for the retroreflector array 6 any device might be used so far as they can precisely reflect back light in the reverse direction, thus for instance retroreflective coatings or retroreflective paints might be used on the surface of a board. Furthermore, its shape might be curved as in FIG. 9, or a flat surface might be used as well. For instance, the retroreflector array 6, with a detail of the plane drawing shown enlarged in FIG. 10(a), is as a corner cube array, consisting of a set of corner cubes, made of shapes of one corner of a cube. Each retroreflector 61 consists of three specular surfaces 61a, 61b and 61c, of identically shaped isosceles right triangles of identical size, so that when one of their tips is connected together and viewed from the front, they form an equilateral triangle; and the three specular surfaces 61a, 61b and 61c are pairwise orthogonal and together form a corner cube. Furthermore, the retroreflector array 6 with its plane drawing shown enlarged in FIG. 10(b), is also a corner cube array, consisting of a set of corner cubes, made of shapes of one corner of a cube. Each retroreflector 61 consists of three specular surfaces 61a, 61b and 61c, of identically shaped squares of identical size, so that when one of their tips is connected together and viewed from the front, they form an equilateral hexagonal shape, and the three specular surfaces 61a, 61b and 61c are pairwise orthogonal. The retroreflector array 6 differs only in shape from the retroreflector array 6 shown in FIG. 10(a) but its principle of recursive reflection is identical. Taking FIGS. 11(a) and (b) as examples to explain the retroreflector arrays 6 shown in FIG. 10(a) and FIG. 10(b), as light arrives at one of the specular surfaces of the retroreflector (for instance, at 61a), it will be reflected in sequence to other specular surfaces (61b and 61c), thereby getting reflected back in the same direction from where it arrived to the retroreflector 6. It should be noted that the arriving direction and the departing direction of light paths at the retroreflector array 6 are strictly speaking not overlapping but parallel; however, as far as the dimensions of the retroreflectors 61 are sufficiently small compared with the dimensions of the retroreflector array 6, for practical purposes the arriving and departing directions of the light paths could be deemed overlapping. The difference of the above-mentioned two types of corner cube arrays is that while the case of specular surfaces shaped like isosceles right triangles is slightly easier to manufacture, it has slightly weaker retroreflecting capability; on the other hand, with specular surfaces shaped like squares, it is slightly more difficult to manufacture, but it has somewhat higher retroreflecting capability.

For the retroreflector array 6, in addition to the above-mentioned corner cube arrays, recursively reflecting devices with three mirror surfaces (broadly stated, 'corner reflectors') might be used as unit retroreflective elements. While it is not shown here, for instance, of three mirror surfaces, two can be perpendicular, while the third one might have an angle of 90/N degrees with the other two (here N is an integer number); or the three mirror surfaces might have mutual angles with the adjacent ones of 90 degrees, 60 degrees, and 45 degrees; such narrow-angle corner reflectors are also suitable as the unit retroreflective elements of the retroreflector 3 used for the current exemplary embodiment. In addition, cat's eye reflectors or such can also be used as the unit retroreflective elements. These retroreflector arrays might be flat, or they also might have curved shapes. In the example in FIG. 9, the retroreflector array 6 with a shape of spherical portion is arranged at the outer side of display 3, but as long as the light emitted from the images O in the display surface 31 and reflected from the half-mirror 5 can be recursively reflected by it, the retroreflector array 6 and its placement can be set as desired.

In case of a three-dimensional floating image display device X2 of such a configuration, similarly to the case of the first embodiment, as the real mirror image forming optical system 2B can always form the real mirror image of the object to be projected in a planar symmetric position with respect to the symmetry surface S2, by moving the display 3 with the actuator means 4 in a three-dimensional manner, the three-dimensional floating image P of the image O becomes observable in the space above the half-mirror 5 as the set of real mirror images.

Figure 12:
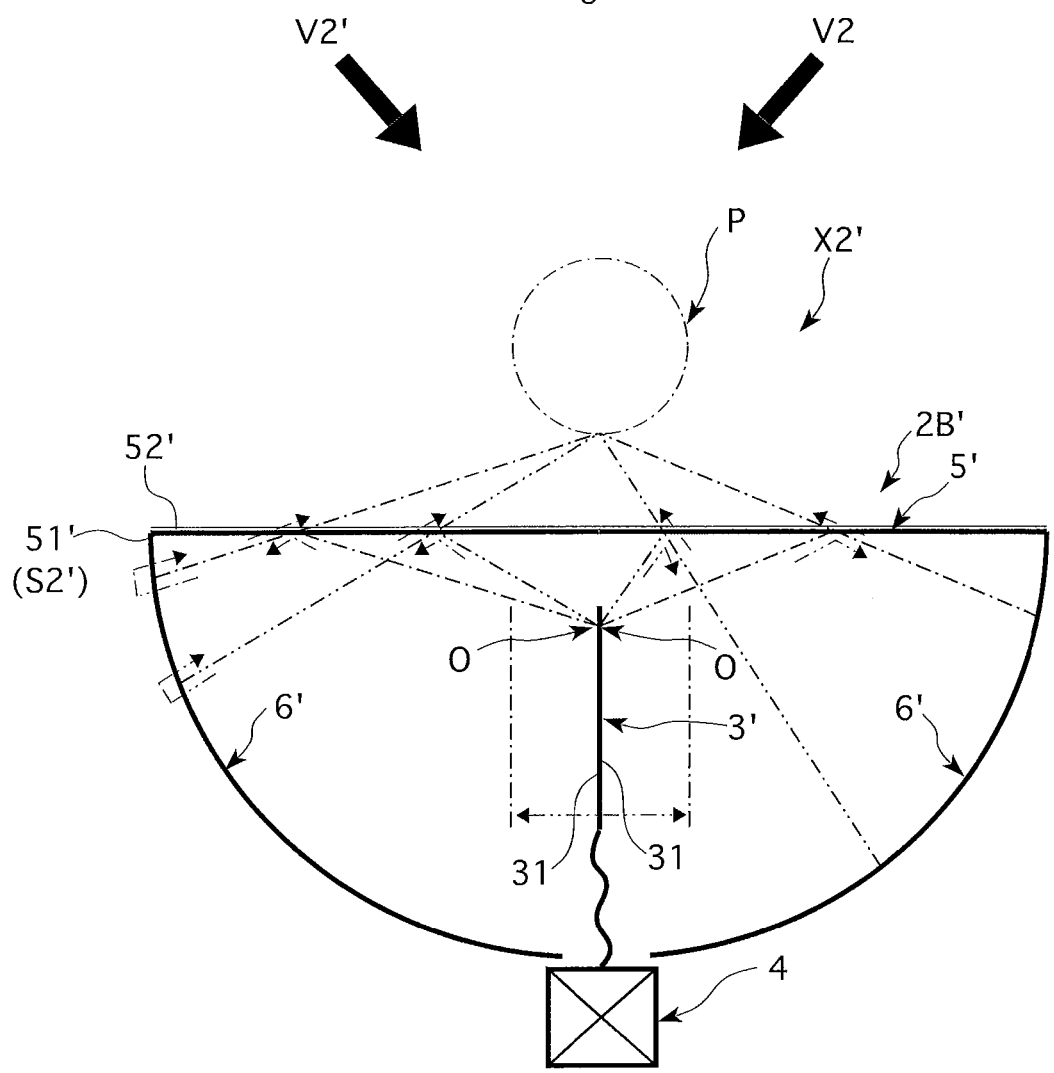
FIG. 12 is a side view showing schematically a multiple viewpoint three-dimensional floating image display device as an exemplary variant of the second embodiment of the present invention.

Also, by changing the configuration and location of the retroreflector array 6, as explained in the case of the first embodiment, a display 3' with two display surfaces 31 and 31 on its both sides can be used, so that it will be possible to make a multiple viewing point three-dimensional floating image P, that is, to make the image O observable as a three-dimensional floating image from multiple viewpoints. FIG. 12 shows an example of a three-dimensional floating image display device X2' used to realize the visibility from multiple viewpoints in a outline cross section drawing. In this three-dimensional floating image display device X2' a real mirror image forming optical system 2B' is used that encloses the two-sided display 3' with a disc-shaped half-mirror 5' and with a hemispherically shaped retroreflector array 6' placed under its bottom side. The half-mirror 5' is equivalent to the above-mentioned half-mirror 5 and differs from it only in shape, thus the half-mirror surface 51' becomes the symmetry surface S2'. Furthermore, on the top surface of the half-mirror 5' there is an optical film coating 52' of light controlling optical films or visibility angle control films, used as a means to pass through light rays in specific directions, and block light in other directions; or to disperse light in specific directions only. Meanwhile, the retroreflector array 6', just as the retroreflector array 6 described above, has a curved upper surface with a large number of retroreflectors 61 formed on it. The bottom part of the retroreflector array 6' that is located just under the display 3' will not participate in the recursive reflection of light rays and thus there are no retroreflectors 61 there, but there is no particular disadvantage if there also are retroreflectors 61 formed in that region.

In this case, the light emitted in various directions from the images O shown in the display surfaces 31 and 31 of the double-sided display 3' is reflected from the half-mirror 5', then recursively reflected from the retroreflector array 6' placed under the half-mirror 5', then by directly passing through the half-mirror 5', forms an image in the space over the half-mirror 5'. The light that is emitted from the image O straight upwards and reflected from the half-mirror 5', will return to its origin in the image O, thus it will not be recursively reflected by the retroreflector array 6', and for this reason, the bottom part of the retroreflector array 6' will not be used for recursive reflection. Therefore, the three-dimensional floating image P which is a set of real images, will be observable in the space above the top surface of half-mirror 5' simultaneously in at least two points taken as the viewing points V2 and V2' except for directly above the image O. Furthermore, since among the light rays emitted from image O, those that are directly transmitted through the half-mirror 5' without having been reflected are prevented by the optical film 52' from reaching the observation point, directly observing the image O from the viewing point above the half-mirror 5' will be prevented.

This kind of real mirror image forming optical system with multi-view capability is not limited to the embodiment described above, but as long as the object to be projected is surrounded by the half-mirror and the retroreflector, their shape and so on might be designed as desired. Furthermore, the real mirror image forming optical system used in the present embodiment is not limited to the embodiment described above, but the concrete structure and shape of the half-mirror or the retroreflector array or such might be chosen as desired from among many possible variants. In addition, similarly to the case of the first embodiment, the display surface of the display might be placed facing the symmetry surface, and the actuator means 4 can move the display in a three-dimensional manner in the direction perpendicular to the symmetry surface, in which case even if the display surface is a single plane, observation from multiple viewpoints becomes possible. However, in this case, as it was explained for the case of the first embodiment, it is not possible to change the image according to the point of view, thus only transparent three-dimensional images can be displayed.

<Third Embodiment>

Figure 13:
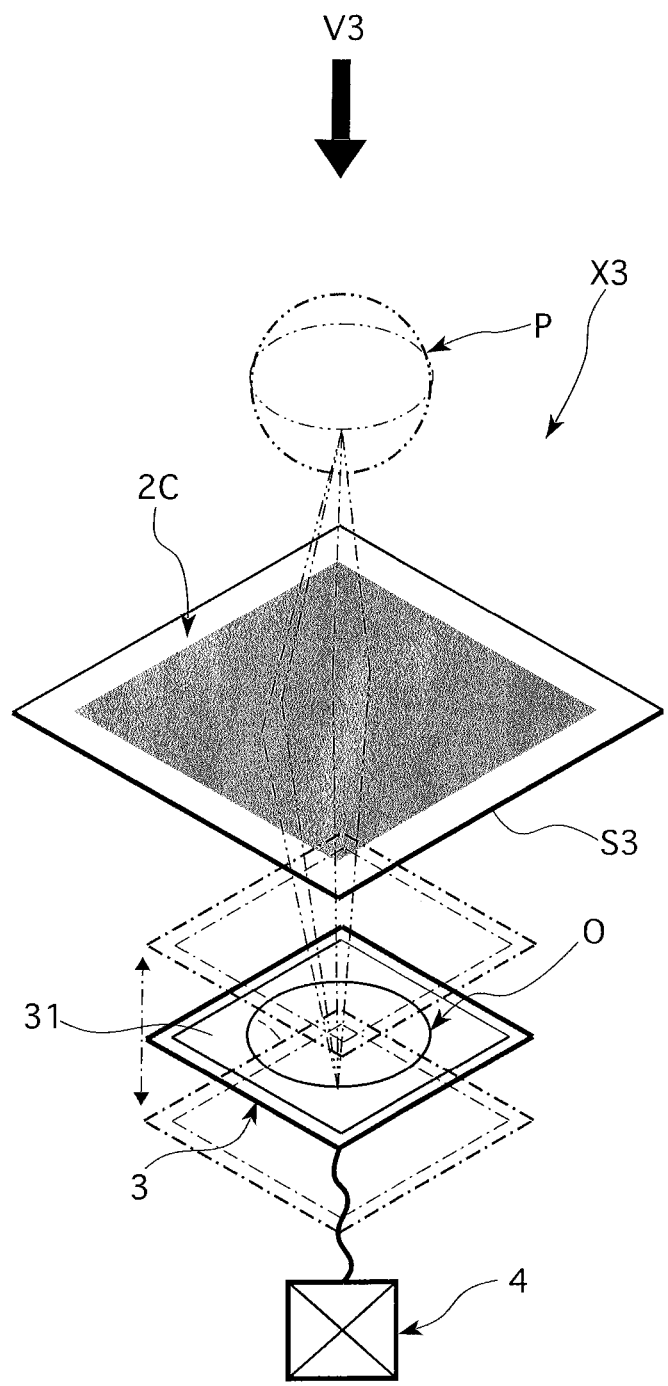
FIG. 13 is a perspective view showing schematically the third embodiment of the three-dimensional floating image display device of the present invention.
Figure 14:
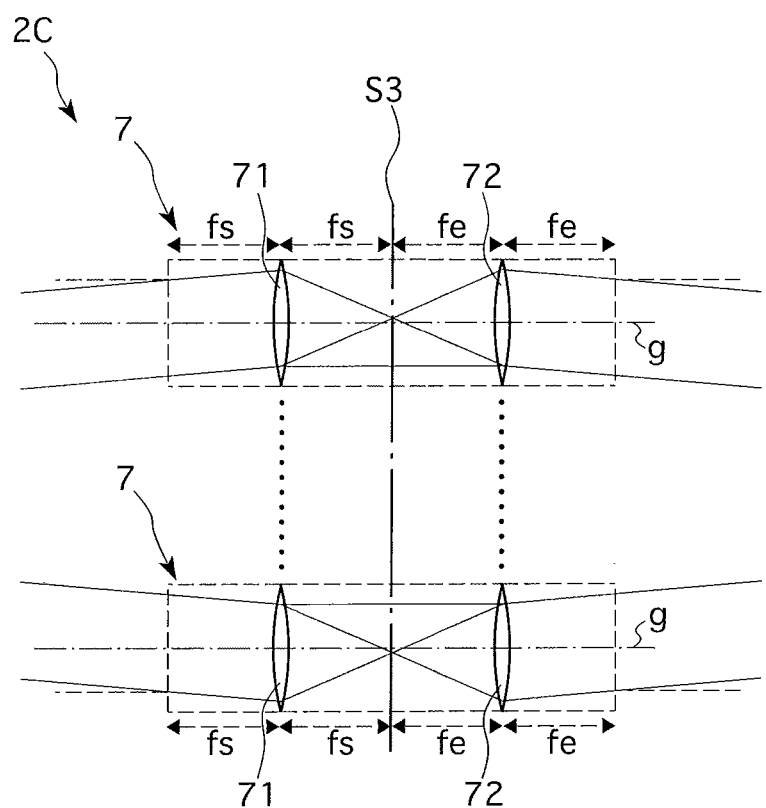
FIG. 14 is a side view showing schematically the afocal lens array used as the real mirror image forming optical system of the third embodiment of the present invention.

Next the third embodiment of the present invention is described referring to FIGS. 13 and 14. Pertaining to this embodiment, the three-dimensional floating image display device X3 uses an afocal lens array 2C as the real mirror image forming optical system, while the configuration of the display 3 and the actuator means 4 is similar to the case of the first embodiment, which has arranged the display 3 parallel to the symmetry surface (see FIG. 7). This afocal lens array 2C is, as shown in FIG. 14, constructed by arranging a large number of afocal lenses 7 along an optical device plane S3. Specifically, the afocal lens 7 is constructed from two lenses 71 and 72 that share a common optical axis g that is perpendicular to the optical device plane S3, and are placed at the distance of their focal distances fs and fe. In this example, convex lenses are used for both lenses 71 and 72. That way, the incident light rays entering lens 71 from one side of the optical device plane S3 will each exit lens 72 on the opposite side, and converge in a planar symmetric position to the optical device plane S3 with respect to the light source. In other words, an image will be formed at a planar symmetric position to the optical device plane S3 of the image O displayed in the display surface 31 of the display 3 and serving as the light source. In the case when an afocal lens array 2C is employed to form an image of the object to be projected in a planar symmetric position with respect to the optical device plane S3, the angle of visibility will be limited to nearly vertical directions.

In case of a three-dimensional floating image display device X3 of such a configuration, in a similar way to the case of the first and second embodiments, since the real mirror image of the image O displayed in the display surface 31 of the display 3 which is the object to be projected will always be formed in a planar symmetric position with respect to the optical device plane S3 which is the symmetry surface, by moving display 3 by the actuator means 4 in a three-dimensional manner, and changing the image O shown in the display surface 31 accordingly to that motion, it will become possible to produce the three-dimensional floating image P as a set of the real mirror images of the image O in the space above the top surface of the afocal lens array 7.

It should be noted that the present invention is not limited to the above-mentioned embodiments. While in each of the above examples we have explained arrangements where by moving the display in a vibrating (reciprocating) motion by an actuator means, from the images of circles with changing diameters the three-dimensional floating image of a sphere is formed in the air, it is allowed to set the configuration of the images shown in the display and the three-dimensional motion of the display due to the actuator means as required. For example, by locating the display in a position so its display surface is parallel to the symmetry surface of the real mirror image forming optical system, and having the actuator means move the display in the normal direction to the symmetry surface, then even by using a display having a display surface only on its side facing the symmetry surface it will still be possible to achieve a multiple viewing point three-dimensional floating image. In other details and component parts too, they shall not be limited to the above-mentioned embodiments or examples, but might be determined in many similar ways in accordance with the essence of the present invention.

INDUSTRIAL APPLICABILITY

The present invention can be used as a display device showing a three-dimensional image floating in the air by showing an image on a display and by volume scanning that display.

I claim:

1. A volume scanning Three-Dimensional floating image display device, comprising:
    a real mirror image forming optical system, capable of forming the real mirror image of an object to be projected in a planar symmetric position with respect to a geometrical plane, said plane becoming a symmetry surface, and
    a display located under said symmetry surface and comprising a display surface for showing images as said object to be projected, and
        an actuator means that can move said display in a path containing a component perpendicular to said display surface;
    wherein said real mirror image forming optical system is a dihedral corner reflector array comprising a plurality of dihedral corner reflectors, said dihedral corner reflectors comprising of two mutually perpendicular specular surfaces arranged perpendicularly to an optical device plane, whereas said optical device plane becomes said symmetry surface,
    wherein by changing the images shown in said display surface in synchronicity with the movement of said display due to said actuator means, a Three-Dimensional floating image of said images will be formed in the space above said symmetry surface.

2. A volume scanning three-dimensional floating image display according to claim 1, wherein a plurality of said dihedral corner reflectors are arranged while being rotated in a plurality of directions around a common axis of rotation that is perpendicular to the said optical device plane, whereby said three-dimensional image will be formed in the space above said optical device plane in a manner to be observable from multiple observing points in said space.

3. A volume scanning three-dimensional floating image display according to claim 1, wherein said display comprises of display surfaces on both of its front and back sides.

4. A volume scanning three-dimensional floating image display according to claim 1, wherein said display is located with its display surface facing said symmetry surface, and said actuator means is made capable of moving said display in a path containing a component perpendicular to said symmetry surface.

* * * * *